United States Patent
Shiozaki et al.

(10) Patent No.: US 7,424,222 B2
(45) Date of Patent: Sep. 9, 2008

(54) OPTICAL PACKET EXCHANGER

(75) Inventors: Toru Shiozaki, Kyoto (JP); Masaru Fuse, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 454 days.

(21) Appl. No.: 10/542,652

(22) PCT Filed: Jun. 29, 2004

(86) PCT No.: PCT/JP2004/009495
§ 371 (c)(1),
(2), (4) Date: Jul. 19, 2005

(87) PCT Pub. No.: WO2005/002092
PCT Pub. Date: Jan. 6, 2005

(65) Prior Publication Data
US 2006/0182443 A1 Aug. 17, 2006

(30) Foreign Application Priority Data
Jun. 30, 2003 (JP) .............................. 2003-186808

(51) Int. Cl.
*H04J 14/00* (2006.01)
*H04B 10/00* (2006.01)
(52) U.S. Cl. .............................. 398/46; 398/51; 398/54; 398/166
(58) Field of Classification Search ............. 398/46, 398/47, 51, 54, 57, 53, 49, 166
See application file for complete search history.

(56) References Cited

U.S. PATENT DOCUMENTS 4,939,721 A    7/1990    De Bosio (Continued)

FOREIGN PATENT DOCUMENTS

EP    0 550 046 A2    7/1993

(Continued)

OTHER PUBLICATIONS

Patent Abstracts of Japan, vol. 2000, No. 14, Mar. 5, 2001 & JP 2000 324 054 A (NEC Corp), Nov. 24, 2000.

(Continued)

*Primary Examiner*—Dalzid Singh
(74) *Attorney, Agent, or Firm*—Wenderoth, Lind & Ponack, L.L.P.

(57) ABSTRACT

An optical packet exchanger is provided which prevents a transmittable capacity of an information signal from decreasing, and which facilitates the extracting an address signal even if a modulation speed for the information signal becomes high. An optical modulation section (102) outputs an optical packet obtained by subjecting output light from a light source (101) to an intensity modulation using an information signal and a phase modulation using an address signal corresponding to a transmission destination for the information signal. An optical splitter section (301) splits the optical packet into two optical packets. An address reading section (302) reads the address signal from the phase of one of the optical packets output from the optical splitter section (301). Based on the address signal output from the address reading section (302), a path switching section (303) determines an output port for the other optical packet output from the optical splitter section (301).

13 Claims, 10 Drawing Sheets

U.S. PATENT DOCUMENTS

| | | | |
|---|---|---|---|
| 5,253,250 | A | 10/1993 | Schlafer et al. |
| 5,319,486 | A | 6/1994 | Vogel et al. |
| 6,388,786 | B1 | 5/2002 | Ono et al. |
| 6,626,589 | B1 * | 9/2003 | Epworth ................. 398/54 |
| 6,657,757 | B1 * | 12/2003 | Chang et al. ............ 398/49 |
| 6,728,490 | B1 | 4/2004 | Ohhira |
| 2002/0191251 | A1 * | 12/2002 | Ferguson et al. ....... 359/139 |

FOREIGN PATENT DOCUMENTS

| | | |
|---|---|---|
| EP | 1 113 695 A2 | 7/2001 |

OTHER PUBLICATIONS

K. Seto et al., "giga-bit Ethernet textbook", multimedia tsushin kenkyukai, ASCII corporation, Mar. 1999, pp. 46-47 & 220-223.

* cited by examiner

OPTICAL PACKET EXCHANGER

BACKGROUND OF THE INVENTION

1. Field of the Invention

The present invention relates to an optical packet exchanger, and more particularly to an optical packet exchanger for switching a transmission path for an optical packet signal by using an address signal.

2. Description of the Related Art

An example of a conventional optical packet exchanger for switching a transmission path for an optical packet signal by using an address signal is a device disclosed in, for example, K. SETO et al., "giga-bit Ethernet textbook", multimedia tsushin kenkyukai, ASCII corporation, March 1999. FIG. 11 is a block diagram illustrating an exemplary structure of this conventional optical packet exchanger.

In FIG. 11, the conventional optical packet exchanger is composed of an optical transmitter section 1000, an optical transmission section 2000, and a router section 3000. The optical transmitter section 1000 comprises a light source 1001, an optical modulation section 1002, and a data generation section 1003. The router section 3000 comprises an optical splitter section 3001, a photoelectric conversion section 3004, an address extraction section 3005, and a path switching section 3003. The light source 1001 outputs continuous light. The data generation section 1003 generates a data signal, which includes an information signal to be transmitted plus a header, the header being an address signal corresponding to a transmission destination of the information signal. The optical modulation section 1002 subjects the continuous light which is output from the light source 1001 to an intensity modulation, using the data signal generated by the data generation section 1003. The optical splitter section 3001 splits an optical packet, which is input via the optical transmission section 2000, into two. The photoelectric conversion section 3004 converts one of the output optical packets from the optical splitter section 3001 into an electrical signal. As a result of this process, the data signal is taken out of the optical packet. The address extraction section 3005 removes the information signal from the data signal which has been taken out by the photoelectric conversion section 3004. As a result of this process, the address signal is extracted. In accordance with the address signal which has been extracted by the address extraction section 3005, the path switching section 3003 determines the path for the other output optical packet from the optical splitter section 3001.

However, the aforementioned conventional optical packet exchanger has a problem in that, since a data signal to which the address signal corresponding to the information signal is added as a header is used, the transmittable capacity is decreased by the amount corresponding to the address signal; that is, the transmission efficiency is decreased. In addition, when the modulation speed for the information signal becomes high, the modulation speed for the address signal also becomes high. This makes it difficult for the address extraction section 3005 in the router section 3000 to read the address signal.

Therefore, an object of the present invention is to provide an optical packet exchanger which, in a situation where a transmission path for an optical packet is to be switched by using an address signal, prevents the transmittable capacity for the information signal from being decreased due to the increased transmission size ascribable to the address signal, and which facilitates the extraction of the address signal even if the modulation speed for the information signal becomes high.

BRIEF SUMMARY OF THE INVENTION

The present invention is directed to an optical packet exchanger for switching a transmission path for an optical packet which constitutes a burst-type optical signal. In order to achieve the above object, the optical packet exchanger according to the present invention comprises an optical transmitter section, an optical transmission section, and a router section.

The optical transmitter section transmits an optical packet, on which an information signal and an address signal corresponding to a transmission destination for the information signal are superposed by different modulation methods. The optical transmission section propagates an optical packet transmitted from the optical transmitter section. The router section receives the optical packet via the optical transmission section, and switches a transmission path for the optical packet based on the address signal which is extracted from the optical packet. Preferably, a modulation speed for the address signal and a modulation speed for the information signal are different.

The optical transmitter section may have either one of the following structures, for example. The optical transmitter section may include a light source for outputting continuous light, and an optical modulation section for outputting an optical packet which is obtained by subjecting the output light from the light source to an intensity modulation using the information signal and a phase modulation using the address signal. Alternatively, the optical transmitter section may include a light signal source for outputting continuous light having been subjected to an intensity modulation using the information signal, and an optical modulation section for outputting an optical packet which is obtained by subjecting the output light from the light signal source to a phase modulation using the address signal. Alternatively, the optical transmitter section may include a light signal source for outputting continuous light having been subjected to a phase modulation using the address signal, and an optical modulation section for outputting an optical packet which is obtained by subjecting the output light from the light signal source to an intensity modulation using the information signal.

The router section may have either one of the following structures, for example. The router section may include: an optical splitter section for splitting the optical packet received via the optical transmission section into two optical packets; an address reading section for reading the address signal based on phase information of one of the optical packets output from the optical splitter section; and a path switching section having a plurality of output ports and selecting, based on the address signal read by the address reading section, one of the plurality of output ports from which to output the other optical packet output from the optical splitter section. Alternatively, the router section may include: an optical splitter section for splitting the optical packet received via the optical transmission section into two optical packets; an address reading section for reading the address signal based on phase information of one of the optical packets output from the optical splitter section; an optical phase adjustment section for adjusting a phase of the other optical packet output from the optical splitter section to a constant phase value, based on the address signal read by the address reading section; and a path switching section having a plurality of output ports and selecting, based on the address signal read by the address reading section, one of the plurality of output ports from which to output the other optical packet whose phase has been adjusted to the constant phase value by the optical phase adjustment section.

A typical optical modulation section comprises: an optical splitter section for splitting the output light from the light source into two light portions; a first splitter section for splitting the address signal into two address signals; a second splitter section for splitting the information signal into two information signals; a phase inversion section for inverting a phase of one of the information signals output from the second splitter section; a first synthesis section for combining one of the address signals output from the first splitter section with the information signal whose phase has been inverted by the phase inversion section, to output a first synthesized signal; a second synthesis section for combining the other address signal output from the first splitter section with the other information signal output from the second splitter section, to output a second synthesized signal; a first waveguide for subjecting one of the light portions output from the optical splitter section to a phase modulation using the first synthesized signal; a second waveguide for subjecting the other light portion output from the optical splitter section to a phase modulation using the second synthesized signal; and an optical synthesis section for permitting optical synthesis and interference between the optical phase modulated signal output from the first waveguide and the optical phase modulated signal output from the second waveguide to generate the optical packet.

A typical address reading section includes: a phase/intensity conversion section for outputting an optical signal which is obtained by converting optical phase variation in one of the optical packets output from the optical splitter section into optical intensity variation; and a photoelectric conversion section for converting the optical signal output from the phase/intensity conversion section into an address signal. Alternatively, the address reading section may include: a phase/intensity conversion section for outputting an optical signal which is obtained by converting optical phase variation in one of the optical packets output from the optical splitter section into optical intensity variation; and a photoelectric conversion section for converting the optical signal output from the phase/intensity conversion section into positive and negative address signals, the negative address signal being obtained by inverting the polarity of the positive address signal, and outputting the positive address signal to the path switching section and the negative address signal to the optical phase adjustment section. Alternatively, the address reading section may include: a phase/intensity conversion section for outputting positive and negative optical signals, the positive optical signal being obtained by converting optical phase variation in one of the optical packets output from the optical splitter section into optical intensity variation, and the negative optical signal being obtained by inverting the polarity of the positive optical signal; a first photoelectric conversion section for converting the positive optical signal output from the phase/intensity conversion section into an address signal and outputting the address signal to the path switching section; and a second photoelectric conversion section for converting the negative optical signal output from the phase/intensity conversion section into an address signal, and outputting the address signal to the optical phase adjustment section.

The photoelectric conversion section may convert an intensity of the optical signal output from the phase/intensity conversion section to logic value 1 if the intensity is equal to or less than a predetermined threshold value and to logic value 0 if the intensity is greater than the predetermined threshold value, thereby extracting the address signal. In this case, the threshold value is preferably equal to or greater than a value which is ¼ as large as a difference between an optical intensity of the optical packet input to the optical splitter section at logic value 1 and an optical intensity of the optical packet at logic value 0, and is equal to or less than a value which is ½ as large as the optical intensity of the optical packet at logic value 0.

The phase/intensity conversion section may comprise a Mach-Zehnder interferometer. The phase/intensity conversion section may output two optical signals whose modulated components are out of phase. In the case where the phase/intensity conversion section outputs two optical signals whose modulated components are out of phase, the photoelectric conversion section may comprise two photodiodes for respectively detecting the two optical signals output from the phase/intensity conversion section. Furthermore, the optical modulation section may perform a phase modulation using the information signal and an intensity modulation using the address signal.

Thus, according to the present invention, decrease in throughput due to multiplexing of an address signal is prevented, and the transmission path for an optical packet can be switched based on a simple structure even if the modulation speed for the information signal becomes high.

DETAILED DESCRIPTION OF THE INVENTION

First Embodiment

Figure 1:
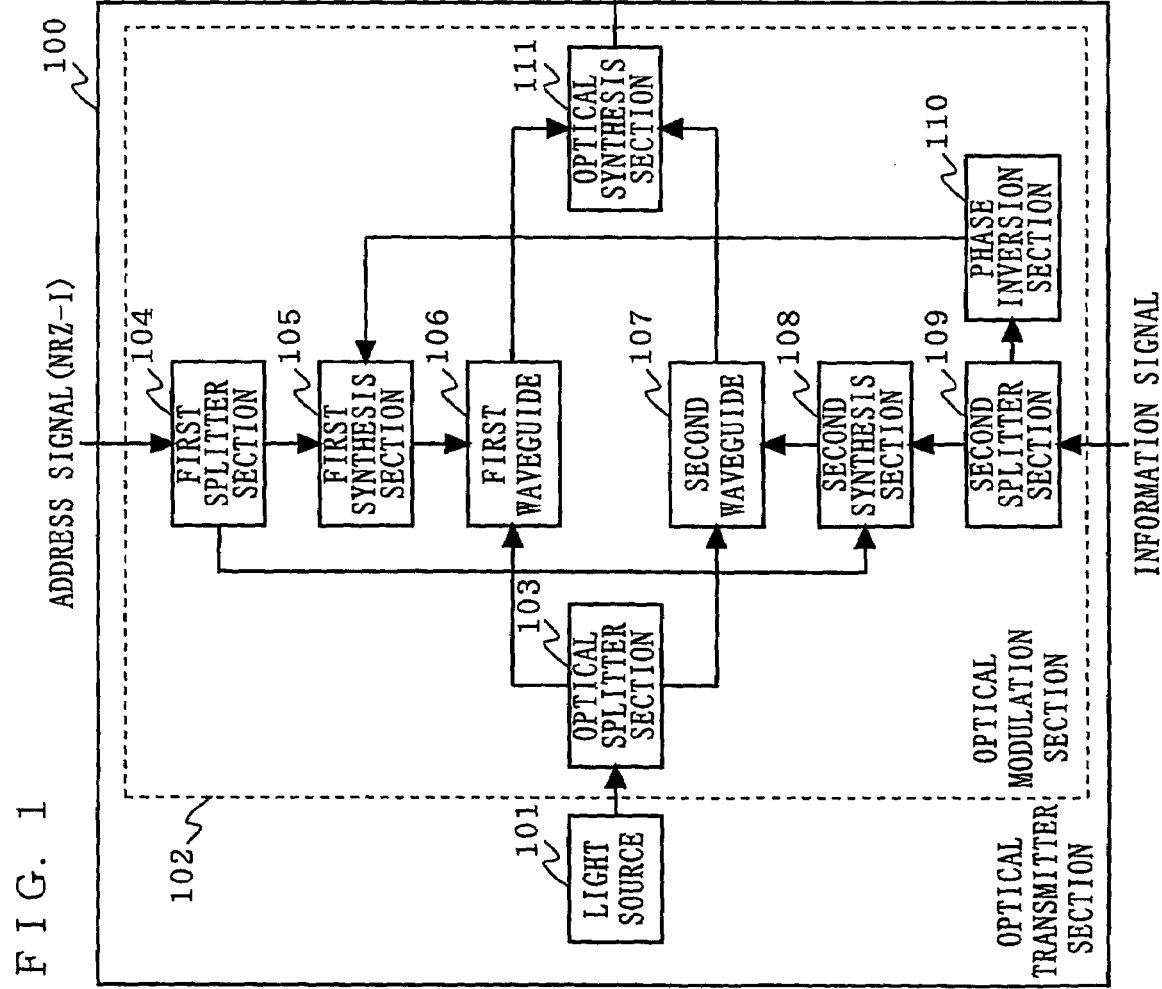
FIG. 1 is a block diagram illustrating the structure of an optical packet exchanger according to a first embodiment of the present invention.

FIG. 1 is a block diagram illustrating the structure of an optical packet exchanger according to a first embodiment of the present invention. In FIG. 1, the optical packet exchanger according to the first embodiment is composed of an optical transmitter section 100, an optical transmission section 200, and a router section 300. The optical transmitter section 100 comprises a light source 101 and an optical modulation section 102. The optical modulation section 102 includes an optical splitter section 103, a first splitter section 104, a first synthesis section 105, a first waveguide 106, a second waveguide 107, a second synthesis section 108, a second splitter section 109, a phase inversion section 110, and an optical synthesis section 111. The router section 300 comprises an optical splitter section 301, an address reading section 302, and a path switching section 303. The address reading section 302 includes a phase/intensity conversion section 304 and a photoelectric conversion section 305.

Hereinafter, with reference to FIG. 1, an operation of the optical packet exchanger having the above structure will be described.

In the optical transmitter section 100, the light source 101 outputs continuous light. The optical splitter section 103 splits the continuous light which is output from the light source 101, and outputs two portions of light. The second splitter section 109 receives an information signal to be transmitted, and splits the information signal into two output information signals. The first splitter section 104 receives an address signal corresponding to a destination to which the information signal is to be transmitted, and splits the address signal into two output address signals. The phase inversion section 110 receives one of the output information signals from the second splitter section 109, inverts the phase of the information signal, and outputs the resultant signal. The first synthesis section 105 combines one of the output address signals from the first splitter section 104 with the information signal whose phase has been inverted by the phase inversion section 110, thereby generating a first synthesized signal D1. The second synthesis section 108 combines the other output address signal from the first splitter section 104 with the other output information signal from the second splitter section 109, thereby generating a second synthesized signal D2.

The first waveguide 106 subjects one of the output light portions from the optical splitter section 103 to a phase modulation based on the first synthesized signal D1 which has been generated by the first synthesis section 105, thereby generating an optical phase modulated signal E1. The second waveguide 107 subjects the other output light portion from the optical splitter section 103 to a phase modulation based on the second synthesized signal D2 which has been generated by the second synthesis section 108, thereby generating an optical phase modulated signal E2. The optical synthesis section 111 permits optical synthesis and interference between the optical phase modulated signal E1 which is output from the first waveguide 106 and the optical phase modulated signal E2 which is output from the second waveguide 107, thereby generating an optical packet. This optical packet is transmitted to the router section 300 via the optical transmission section 200.

In the router section 300, the optical splitter section 301 splits an optical packet which has been transmitted via the optical transmission section 200 into two output optical packets. The phase/intensity conversion section 304 converts optical phase variation in one of the output optical packets from the optical splitter section 301 into optical intensity variation, and outputs the resultant optical signal. The photoelectric conversion section 305 converts the output optical signal from the phase/intensity conversion section 304 into an address signal. The path switching section 303 has at least one input port for receiving the other output optical packet from the optical splitter section 301, and a plurality of output ports (FIG. 1 shows an example where there are three output ports). Based on the address signal which is output from the photoelectric conversion section 305, the path switching section 303 selects one of the output ports to be used for outputting the optical packet which is output from the optical splitter section 301.

Figure 2:
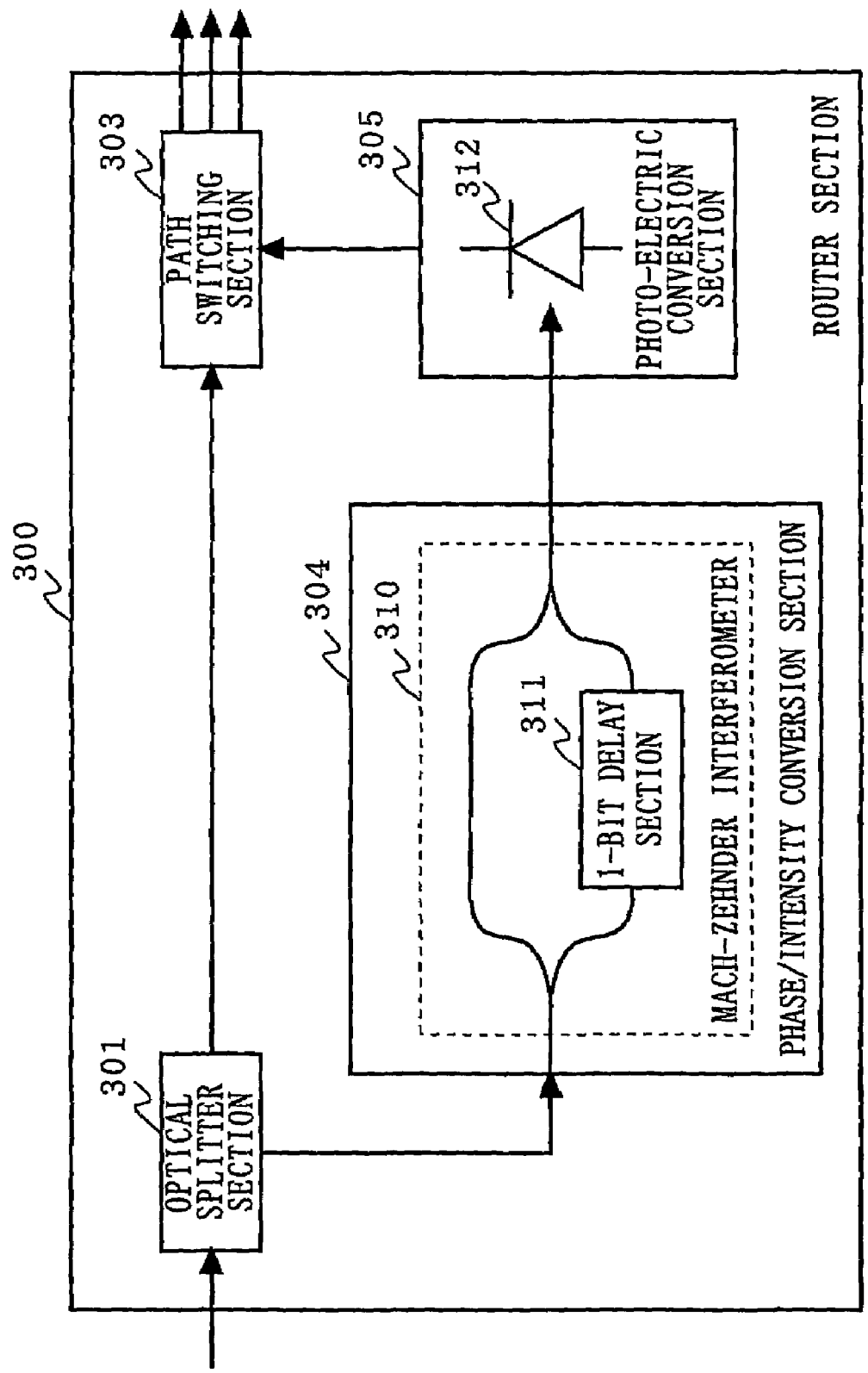
FIG. 2 is an exemplary block diagram illustrating the details of a portion of a router section 300.

Next, the details of the phase/intensity conversion section 304 will be described. FIG. 2 is an exemplary block diagram illustrating the details of a portion of the router section 300 shown in FIG. 1. In FIG. 2, the phase/intensity conversion section 304 is composed of, for example, a Mach-Zehnder interferometer 310. The Mach-Zehnder interferometer 310 includes a 1-bit delay section 311, thus having a function of splitting the optical signal into two optical signals, a function of delaying one of the split optical signals, and a function of combining the two optical signals. The photoelectric conversion section 305 includes a photodiode 312.

As described above, one of the optical packets which have been split by the optical splitter section 301 is further split into two optical packets within the Mach-Zehnder interferometer 310 in the phase/intensity conversion section 304. Each of the two split optical signals is an optical signal which retains the same phase variation as that of the original optical signal, but which has ½ the intensity of the original optical signal. One of the two split optical signals is delayed in the 1-bit delay section 311 by a time T2, which corresponds to one bit of the address signal. Thereafter, the non-delayed optical signal and the delayed optical signal are combined within the Mach-Zehnder interferometer 310.

In the optical packet exchanger according to the first embodiment, two optical signals to be combined are subjected to an intensity modulation and a phase modulation. Therefore, depending on the phase which each of the optical signals to be combined has, the two optical signals will interfere differently with each other at the time of synthesis. Specifically, if one of the optical signals has a phase 0, and the other optical signal has a phase π, the optical waves cancel each other at the time of synthesis, so that the synthesized optical signal has a reduced intensity. On the other hand, if the two optical signals each have the same phase of 0 or π, the optical waves enhance each other at the time of synthesis, so that the synthesized optical signal has an increased intensity.

Figure 3:
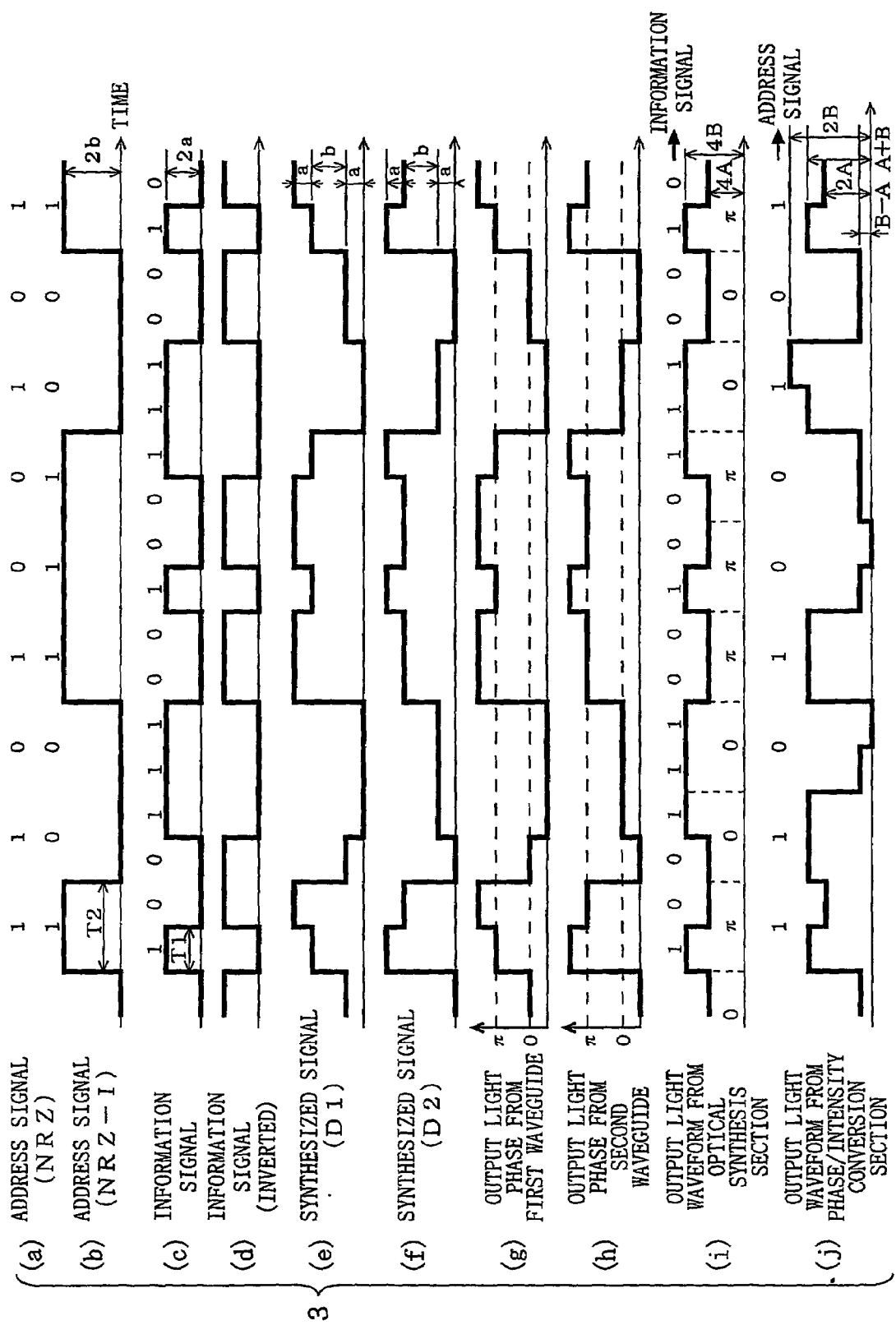
FIG. 3 is a diagram showing exemplary variations in the intensity of electrical signals, and exemplary variations in the phase and intensity of optical signals, which are input to or output from an optical packet exchanger.

FIG. 3 is a diagram showing exemplary variations in the intensity of electrical signals, and exemplary variations in the phase and intensity of optical signals, which are input to or output from the optical packet exchanger, shown as waveforms (a), (b), (c), (d), (e), (f), (g), (h), (i), and (j). Referring to FIG. 3, a specific example of the operation of the optical packet exchanger shown in FIG. 1 will be described. In FIG. 3, the horizontal axis represents time, and the vertical axis represents the intensity (amplitude or voltage) or phase of a signal. The time T1 represents a period of time corresponding to one bit of an information signal, and the time T2 represents a period of time corresponding to one bit of an address signal. The exemplary signal waveforms shown in FIG. 3 are based on the following five conditions:

1. the optical transmission section 200 has no loss;
2. the optical splitter section 301 has a split ratio of 1:1;
3. the information signal has a bit rate which is twice as large as the bit rate of the address signal;
4. the information signal consists of repetitions of "10011100" (waveform (a)); and
5. the address signal consists of repetitions of NRZ code "11010010".

To the second splitter section 109, an information signal "10011100" is input with an amplitude 2a (waveform (c)). An information signal whose phase has been inverted by the phase inversion section 110 is shown as waveform (d). To the first splitter section 104, an address signal which has been converted from the NRZ code "11010010" to an NRZ-I code "10011100" is input with an amplitude 2b (waveform (b)).

One of the two split address signals (amplitude b) from the first splitter section 104 and one of the two split information signals (amplitude a) from the second splitter section 109 are combined by the second synthesis section 108 (waveform (b)+waveform (c)), whereby the second synthesized signal D2 having the waveform (f) is generated. Since the optical splitter section 103 has a split ratio of 1:1 (see condition 2 above), an electrical signal whose intensity varies between the three levels of "a+b", "b", and "a" is applied to the second waveguide 107. Similarly, one of the two split address signals from the first splitter section 104 and the information signal whose phase has been inverted by the phase inversion section 110 are combined by the first synthesis section 105 (waveform (b)+waveform (d)), whereby the first synthesized signal D1 having the waveform (e) is generated.

Figure 4:
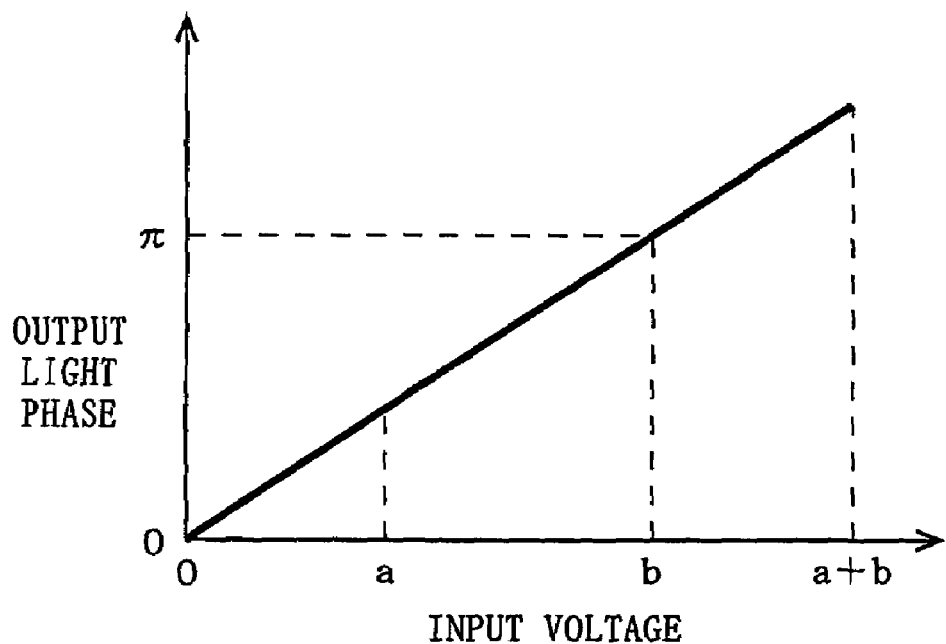
FIG. 4 is a diagram illustrating showing exemplary input/output characteristics of a first waveguide 106.
Figure 5:
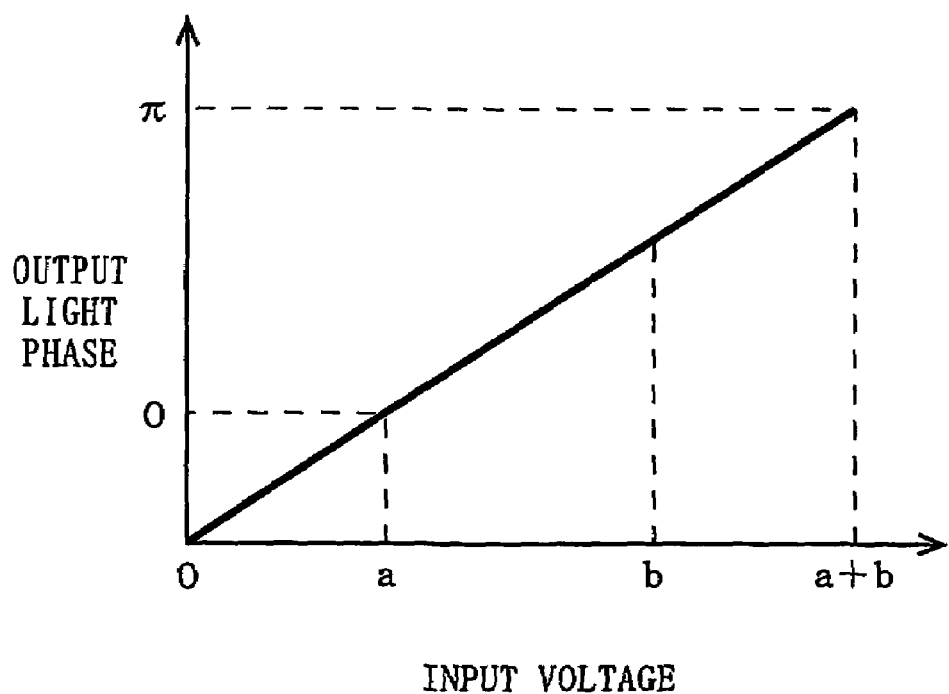
FIG. 5 is a diagram illustrating exemplary input/output characteristics of a second waveguide 107.

FIG. 4 is a diagram illustrating exemplary input/output characteristics of the first waveguide 106. FIG. 5 is a diagram illustrating exemplary input/output characteristics of the second waveguide 107. It is ensured that a half-wavelength voltage of the first waveguide 106 and the second waveguide 107 is equal to a voltage b of the address signal which is output from the first splitter section 104. It is also ensured that output light phase when an input voltage to the first waveguide 106 is zero and an output light phase when an input voltage to the second waveguide 107 is voltage a are identical. The phase of the output light from the first waveguide 106 and the phase of the output light from second waveguide 107 vary as shown by waveform (g) and waveform (h), respectively.

The output light intensity from the optical synthesis section 111 depends on a phase difference between the two light inputs. Specifically, the output light intensity is greater when there is no phase difference than when there is a phase difference. Since the two light inputs are arranged so that there is no phase difference when the information signal is "1", and there is a phase difference when the information signal is "0", it is possible to vary the optical intensity in accordance with the variation in the information signal. On the other hand, the output light from the optical synthesis section 111 has no other than the light phase which is given by the first waveguide 106 and the second waveguide 107. The optical synthesis section 111 permits optical synthesis and interference between the optical signal which is output from the first waveguide 106 and an optical signal which is output from the second waveguide 107, thus sending an optical packet (waveform (i)) whose phase varies between two phases of 0 and π and whose intensity varies between two levels which are defined as 4A and 4B.

Since the optical transmission section 200 has no loss (see condition 1 above) and the first optical splitter section 301 has a split ratio of 1:1 (see condition 2 above), the first optical splitter section 301 outputs optical signals each of which has ½ the intensity and amplitude of those of waveform (i). In other words, each split optical signal from the first optical splitter section 301 has an intensity which varies between 2A and 2B. Since one of the split optical signals is further split into two optical signals in the Mach-Zehnder interferometer 310, an optical signal is obtained which has ¼ the intensity and amplitude of those of waveform (i). In other words, the immediate input optical signal to the 1-bit delay section 311 has an intensity which varies between A and B.

The 1-bit delay section 311 delays one of the two split optical signals by the time T2 corresponding to one bit of the address signal, after which both split optical signals are combined within the Mach-Zehnder interferometer 310. As a result, the phase/intensity conversion section 304 outputs an optical signal whose intensity varies between the five levels of "2A", "A+B", "2B", "A−B", and "0" (waveform (j)). Concerning the intensity of the optical signal, the photoelectric conversion section 305 has a threshold value which is greater than "B−A" and smaller than "2A". If the output optical signal from the phase/intensity conversion section 304 has an intensity which is greater than the threshold value, the photoelectric conversion section 305 outputs "0"; otherwise, the photoelectric conversion section 305 outputs "1". As a result, the address signal which has been transmitted from the optical transmitter section 100 can be properly determined as "11010010" in the photoelectric conversion section 305.

Thus, in accordance with the optical packet exchanger of the first embodiment, the optical transmitter section 100 subjects continuous light which is output from the light source to a phase modulation using an address signal and an intensity modulation using an information signal. The router section 300 splits the received optical packet into two optical packets, converts one of the optical packets into the address signal through a phase/intensity conversion and a photoelectric conversion, and determines an output port for the other optical packet based on the address signal. Thus, decrease in throughput due to multiplexing of an address signal is prevented, and the transmission path for an optical packet can be switched based on a simple structure even if the modulation speed for the information signal becomes high.

The first embodiment illustrates a configuration where the optical transmitter section 100 subjects the continuous light which is output from the light source to a phase modulation using an address signal and an intensity modulation using an information signal. Alternatively, another configuration may be adopted in which the optical transmitter section 100 subjects the continuous light which is output from the light source to an intensity modulation using an address signal, and a phase modulation using an information signal. In this case, the address reading section reads the address signal based on changes in the optical intensity (intensify information). In accordance with such a variant of the optical packet exchanger, too, decrease in throughput due to multiplexing of an address signal is prevented, and the transmission path for an optical packet can be switched based on a simple structure even if the modulation speed for the information signal becomes high.

Figure 6:
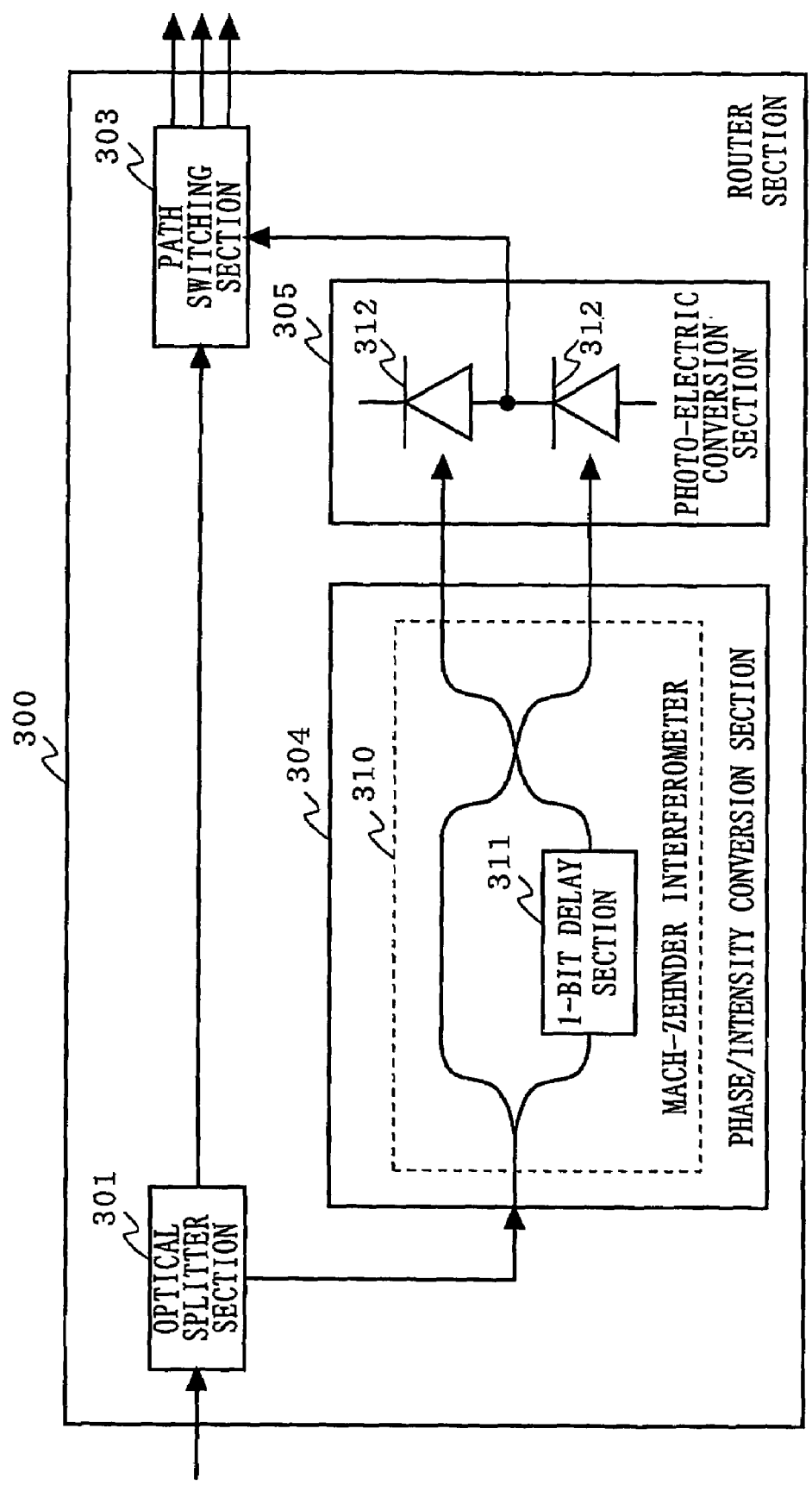
FIG. 6 is another exemplary block diagram illustrating the details of a portion of a router section 300.

In the router section 300 illustrated in the first embodiment, the phase/intensity conversion section 304 outputs one optical signal, and the photoelectric conversion section 305 detects the optical signal which is output from the phase/intensity conversion section 304 by using a single photodiode (see FIG. 2). Alternatively, another configuration may be adopted in which the phase/intensity conversion section 304 outputs two optical signals whose modulated components are out of phase. Specifically, as shown in FIG. 6, the photoelectric conversion section 305 may contain two photodiodes 312, and detect the two optical signals which are output from the phase/intensity conversion section 304 using the two photodiodes 312. Thus, on the basis of the two optical signals, the address signal can be detected in the photoelectric conversion section 305 with a high accuracy and high efficiency.

Second Embodiment

Figure 7:
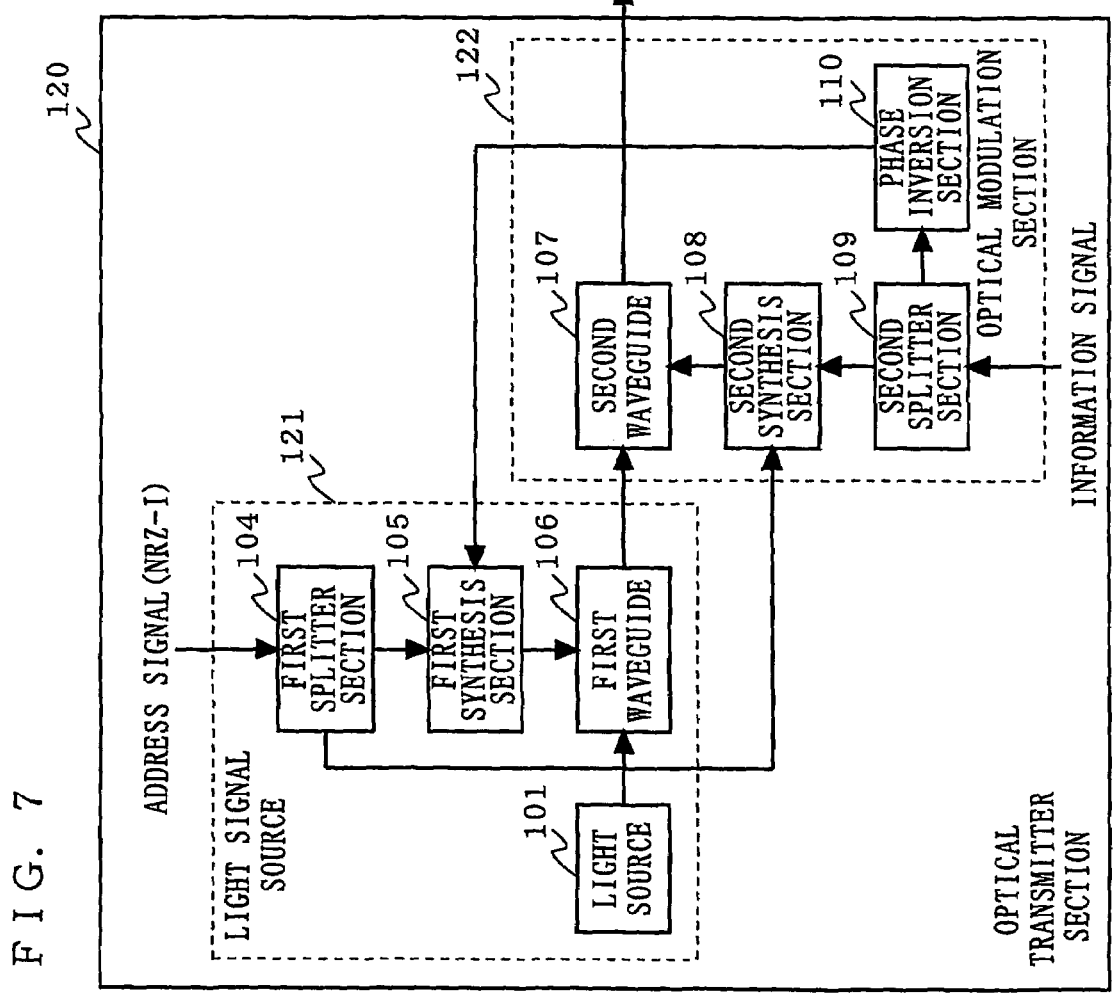
FIG. 7 is a block diagram illustrating the structure of an optical packet exchanger according to a second embodiment of the present invention.

FIG. 7 is a block diagram illustrating the structure of an optical packet exchanger according to a second embodiment of the present invention. In FIG. 7, the optical packet exchanger according to the second embodiment is composed of an optical transmitter section 120, an optical transmission section 200, and a router section 300. The optical transmitter section 120 comprises a light signal source 121 and an optical modulation section 122. The light signal source 121 includes a light source 101, a first splitter section 104, a first synthesis section 105, and a first waveguide 106. The optical modulation section 122 includes a second waveguide 107, a second synthesis section 108, a second splitter section 109, and a phase inversion section 110. The router section 300 has the same structure as that of the router section 300 in the first embodiment.

As seen from FIG. 7, in the optical packet exchanger according to the second embodiment, a phase modulation function using an address signal and an intensity modulation function using an information signal, which are performed in parallel fashion in the optical modulation section 102 according to the first embodiment, are separated so that the phase modulation and the intensity modulation are consecutively performed in this order. Based on this structure, it becomes possible to omit an optical splitter section and an optical synthesis section from the optical modulation section, in addition to attaining the above-described effects.

Third Embodiment

Figure 8:
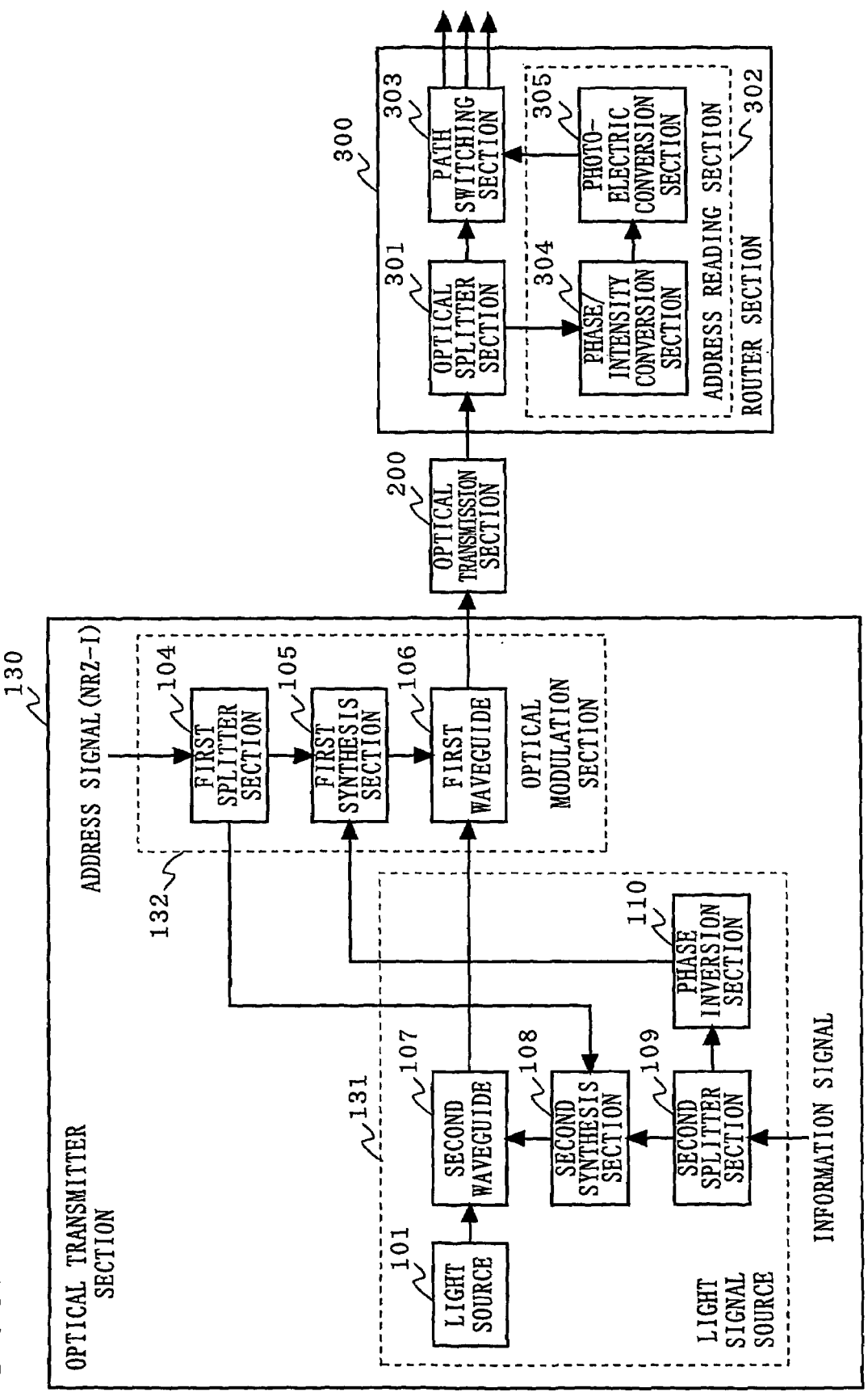
FIG. 8 is a block diagram illustrating the structure of an optical packet exchanger according to a third embodiment of the present invention.

FIG. 8 is a block diagram illustrating the structure of an optical packet exchanger according to a third embodiment of the present invention. In FIG. 8, the optical packet exchanger according to the third embodiment includes an optical transmitter section 130, an optical transmission section 200, and a router section 300. The optical transmitter section 130 comprises a light signal source 131 and an optical modulation section 132. The light signal source 131 includes a light source 101, a second waveguide 107, a second synthesis section 108, a second splitter section 109, and a phase inversion section 110. The optical modulation section 132 includes a first splitter section 104, a first synthesis section 105, and a first waveguide 106. The router section 300 has the same structure as that of the router section 300 in the first embodiment.

As seen from FIG. 8, in the optical packet exchanger according to the third embodiment, a phase modulation function using an address signal and an intensity modulation function using an information signal, which are performed in parallel fashion in the optical modulation section 102 according to the first embodiment, are separated so that the intensity modulation and the phase modulation are consecutively performed in this order. Based on this structure, it becomes possible to omit an optical splitter section and an optical synthesis section from the optical modulation section, in addition to attaining the above-described effects.

Fourth Embodiment

Figure 9:
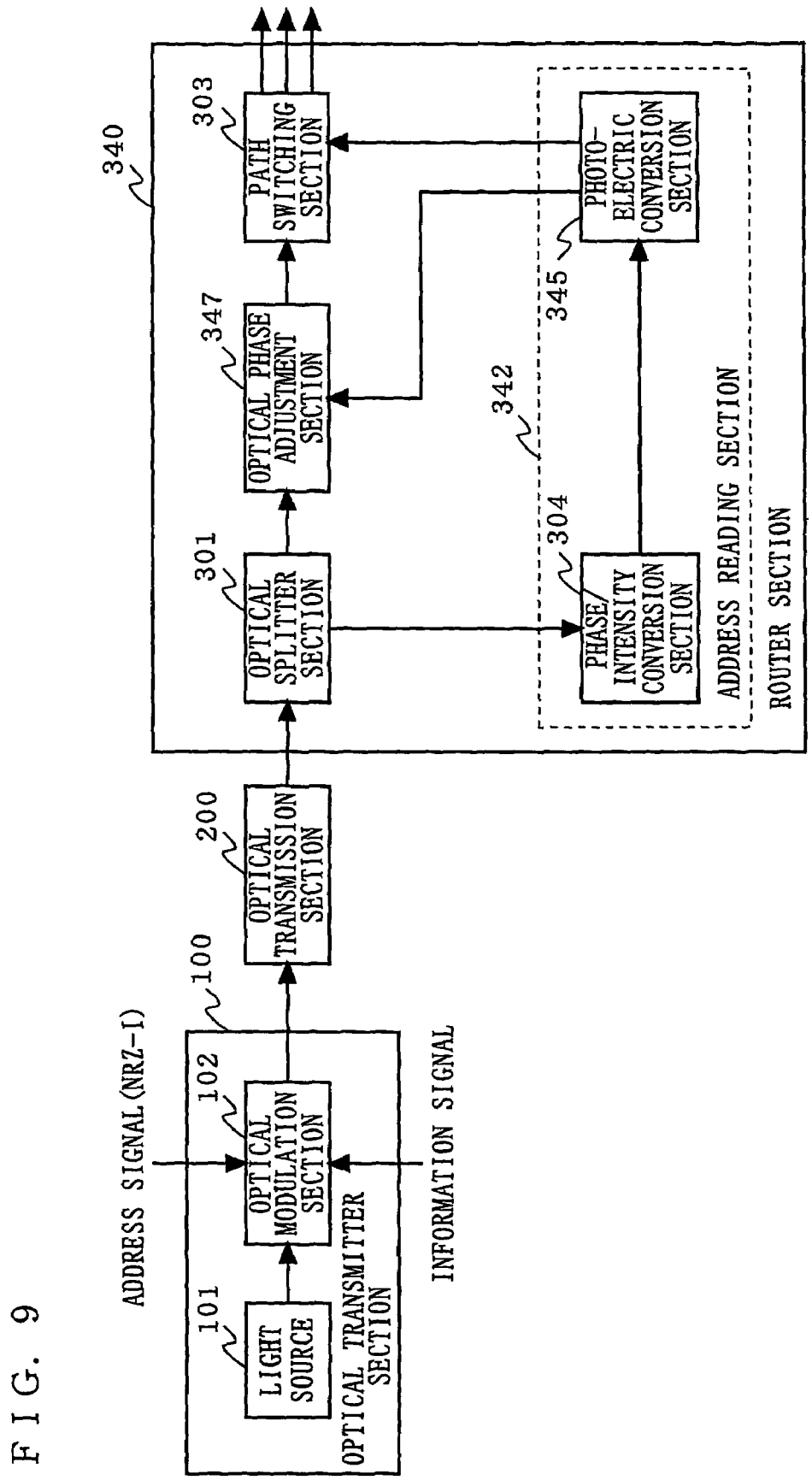
FIG. 9 is a block diagram illustrating the structure of an optical packet exchanger according to a fourth embodiment of the present invention.

FIG. 9 is a block diagram illustrating the structure of an optical packet exchanger according to a fourth embodiment of the present invention. In FIG. 9, the optical packet exchanger according to the fourth embodiment is composed of an optical transmitter section 100, an optical transmission section 200, and a router section 340. The optical transmitter section 100 has the same structure as that of the optical transmitter section 100 in the first embodiment. The router section 340 comprises an optical splitter section 301, an address reading section 342, an optical phase adjustment section 347, and a path switching section 303. The address reading section 342 includes a phase/intensity conversion section 304 and a photoelectric conversion section 345. In FIG. 9, those component elements which also appear in FIG. 1 are denoted by the same reference numerals as those used therein, and the descriptions thereof are omitted.

In the router section 340, the photoelectric conversion section 345 performs a conversion for an output optical signal from the phase/intensity conversion section 304 to generate a "positive" (i.e., non-inverted) address signal and a "negative" (i.e., inverted) address signal which is obtained by inverting the polarity of the positive address signal. The optical phase adjustment section 347 receives the other one of the two split optical packets from the optical splitter section 301 and the negative address signal from the photoelectric conversion section 345, and subjects the optical packet to a phase modulation using negative address signal. Through this process, the phase of the optical packet is adjusted to the initial phase value. The path switching section 303 receives the optical packet having the initialized phase from the optical phase adjustment section 347 and the positive address signal from the photoelectric conversion section 345. Then, based on the positive address signal, the path switching section 303 determines an output port for the optical packet from among the plurality of output ports.

Thus, in the optical packet exchanger according to the fourth embodiment, the phase of the optical packet is initialized by performing another phase modulation using the negative address signal. Thus, the phase can be maintained despite the cascade-connected router section; decrease in throughput due to multiplexing of an address signal is prevented; and the transmission path for an optical packet can be switched based on a simple structure even if the modulation speed for the information signal becomes high. It will be appreciated that the router section 340 according to the fourth embodiment may be used in conjunction with the optical transmitter section 120 according to the second embodiment or the optical transmitter section 130 according to the third embodiment.

Fifth Embodiment

Figure 10:
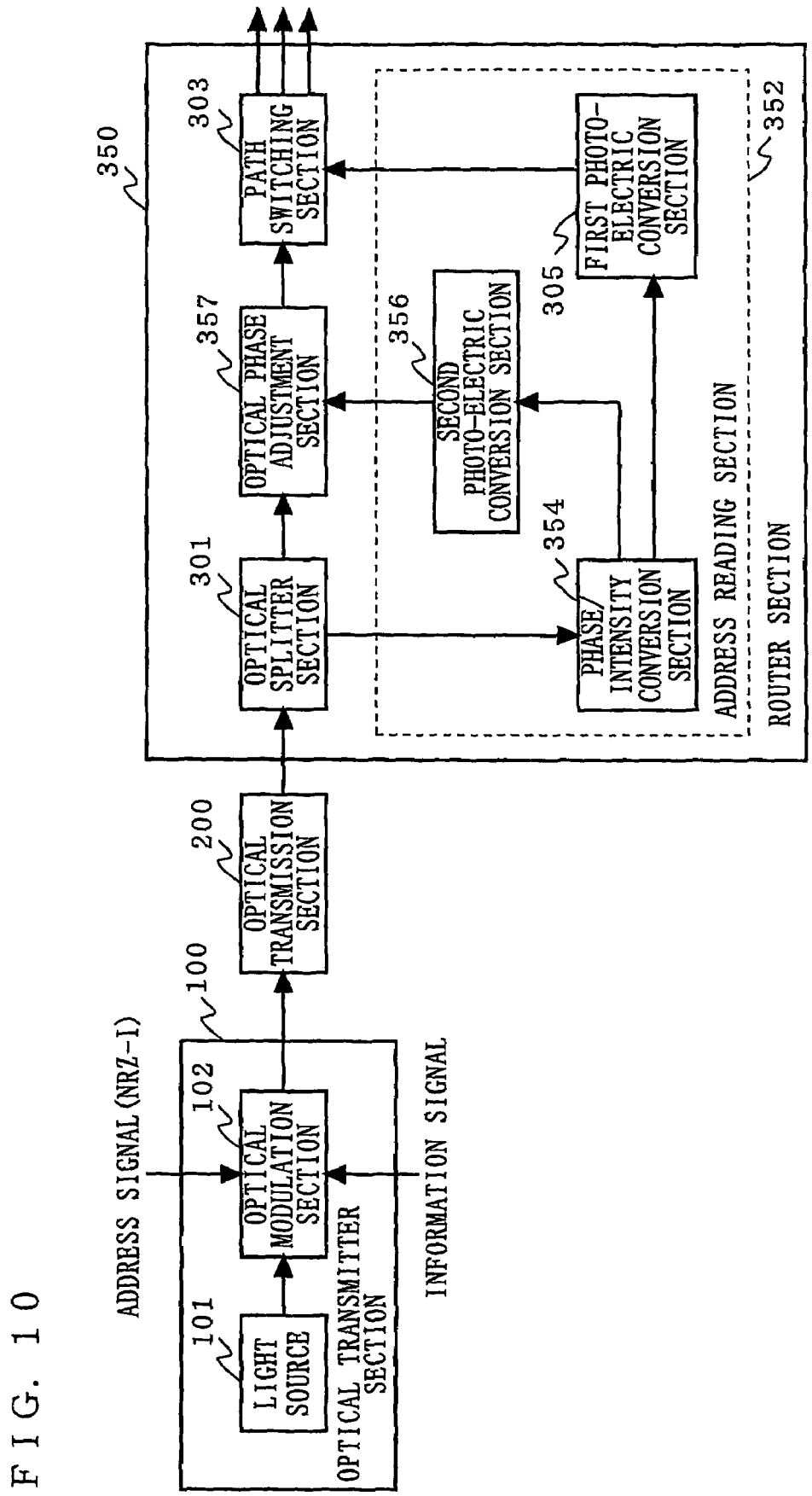
FIG. 10 is a block diagram illustrating the structure of an optical packet exchanger according to a fifth embodiment of the present invention.
Figure 11:
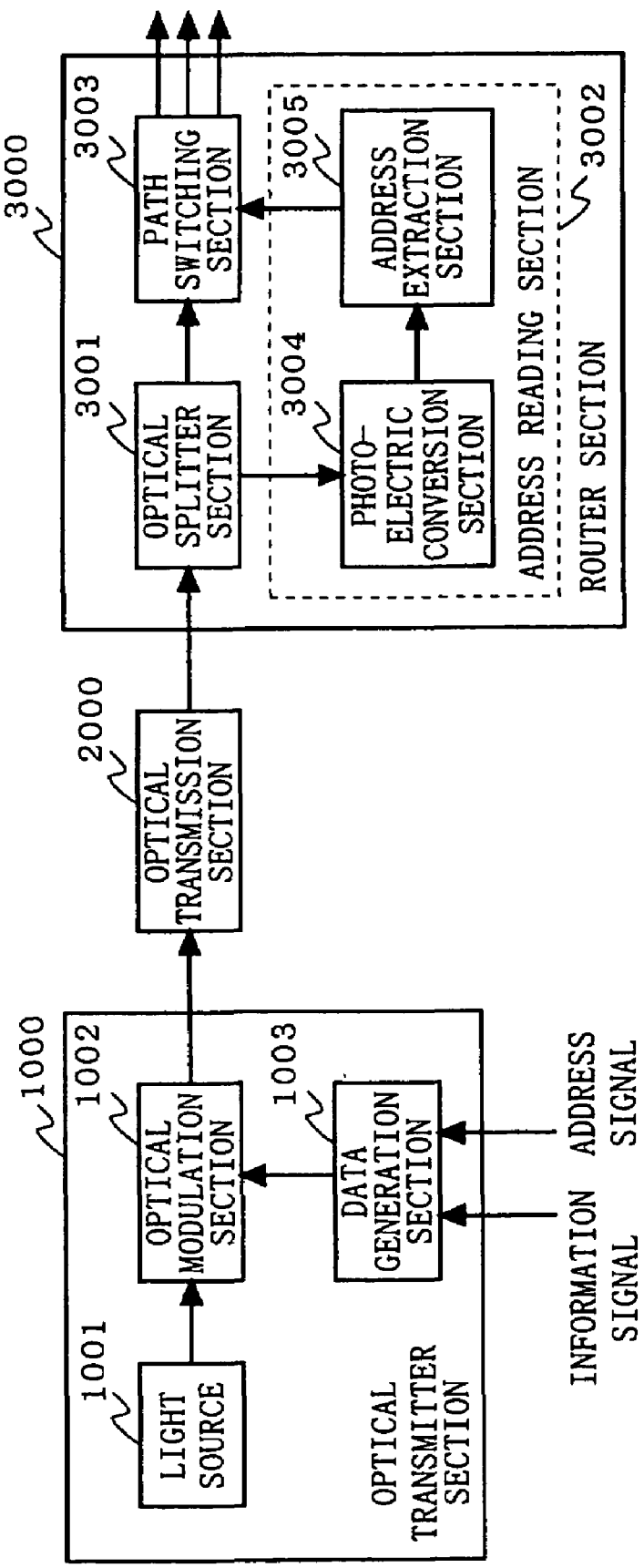
FIG. 11 is a block diagram illustrating the structure of a conventional optical packet exchanger.

FIG. 10 is a block diagram illustrating the structure of an optical packet exchanger according to a fifth embodiment of the present invention. In FIG. 10, the optical packet exchanger according to the fifth embodiment is composed of an optical transmitter section 100, an optical transmission section 200, and a router section 350. The optical transmitter section 100 has the same structure as that of the optical transmitter section 100 in the first embodiment. The router section 350 comprises an optical splitter section 301, an address reading section 352, a second photoelectric conversion section 356, an optical phase adjustment section 357, and a path switching section 303. The address reading section 352 includes a phase/intensity conversion section 354 and a first photoelectric conversion section 305. In FIG. 10, those component elements which also appear in FIG. 1 are denoted by the same reference numerals as those used therein, and the descriptions thereof are omitted.

In the router section 350, the phase/intensity conversion section 354 may be composed of, for example, a Mach-Zehnder interferometer having two output ports. As such, the phase/intensity conversion section 354 converts optical phase variation in an optical packet which is output from the optical splitter section 301 into optical intensity variation, and, from the respective output ports, outputs a positive optical signal and a negative optical signal which is obtained by inverting the polarity of the positive optical signal. The second photoelectric conversion section 356 performs a conversion for the negative optical signal which is output from the phase/intensity conversion section 354 to generate a negative address signal. The optical phase adjustment section 357 receives the other optical packet from the optical splitter section 301 and the negative address signal from the second photoelectric conversion section 356, and subjects the optical packet to a phase modulation using the negative address signal. Through this process, the phase of the optical packet is adjusted to the initial phase value. The first photoelectric conversion section 305 performs a conversion for the positive optical signal which is output from the phase/intensity conversion section 354 to generate a positive address signal. The path switching section 303 receives the optical packet having the initialized phase from the optical phase adjustment section 357 and the positive address signal from the first photoelectric conversion section 305. Then, based on the positive address signal, the path switching section 303 determines an output port for the optical packet from among the plurality of output ports.

Thus, in the optical packet exchanger according to the fifth embodiment, the phase of the optical packet is initialized by performing another phase modulation using the negative address signal. Thus, the phase can be maintained despite the cascade-connected router section, decrease in throughput due to multiplexing of an address signal is prevented, and the transmission path for an optical packet can be switched based on a simple structure even if the modulation speed for the information signal becomes high. It will be appreciated that the router section 350 according to the fifth embodiment may be used in conjunction with the optical transmitter section 120 according to the second embodiment or the optical transmitter section 130 according to the third embodiment.

The first to fifth embodiments illustrate examples where an optical signal which is output from a light source is subjected to a phase modulation using an address signal and an intensity modulation using an information signal. Conversely, the optical signal may be subjected to an intensity modulation using an address signal and a phase modulation using an information signal.

INDUSTRIAL APPLICABILITY

The present invention is applicable to an optical packet exchanger or the like which switches the transmission path for an optical packet signal using an address signal, in particular to the case where decrease in throughput due to multiplexing of an address signal needs to be prevented even if the modulation speed for the information signal becomes high, for example.

The invention claimed:

1. An optical packet exchanger for switching a transmission path for an optical packet which constitutes a burst-type optical signal, said optical packet exchanger comprising:
   an optical transmitter section operable to transmit an optical packet on which an information signal and an address signal corresponding to a transmission destination for the information signal are superposed by different modulation methods, said optical transmitter section including:
      a light source operable to output continuous light; and
      an optical modulation section operable to output an optical packet which is obtained by subjecting output light from said light source to an intensity modulation using the information signal and a phase modulation using the address signal, wherein said optical modulation section comprises:
         an optical splitter section operable to split the output light from said light source into two light portions;
         a first splitter section operable to split the address signal into two address signals;
         a second splitter section operable to split the information signal into two information signals;
         a phase inversion section operable to invert a phase of one of the information signals output from said second splitter section;
         a first synthesis section operable to combine one of the address signals output from said first splitter section with the information signal having a phase that has been inverted by said phase inversion section, to output a first synthesized signal;
         a second synthesis section operable to combine the other address signal output from said first splitter section with the other information signal output from said second splitter section, to output a second synthesized signal;
         a first waveguide for subjecting one of the light portions output from said optical splitter section to a phase modulation using the first synthesized signal;
         a second waveguide for subjecting the other light portion output from said optical splitter section to a phase modulation using the second synthesized signal; and
         an optical synthesis section operable to permit optical synthesis and interference between the optical phase modulated signal output from said first waveguide and the optical phase modulated signal output from said second waveguide to generate the optical packet;
   an optical transmission section for propagating an optical packet transmitted from said optical transmitter section; and
   a router section operable to receive the optical packet via said optical transmission section, and operable to switch a transmission path for the optical packet based on the address signal which is extracted from the optical packet, wherein said router section comprises:
      an optical splitter section operable to split the optical packet received via said optical transmission section into two optical packets;
      an address reading section operable to read the address signal based on phase information of one of the optical packets output from said optical splitter section; and
      a path switching section having a plurality of output ports and being operable to select, based on the address signal read by said address reading section, one of the plurality of output ports from which to output the other optical packet output from said optical splitter section.

2. The optical packet exchanger according to claim 1, wherein said address reading section includes:
   a phase/intensity conversion section operable to output an optical signal which is obtained by converting optical phase variation in one of the optical packets output from said optical splitter section into optical intensity variation; and
   a photoelectric conversion section operable to convert the optical signal output from said phase/intensity conversion section into an address signal.

3. The optical packet exchanger according to claim 2, wherein
   said photoelectric conversion section is operable to convert an intensity of the optical signal output from the phase/intensity conversion section to logic value 1 if the intensity is equal to or less than a predetermined threshold value and to logic value 0 if the intensity is greater than the predetermined threshold value, thereby being operable to extract the address signal.

4. The optical packet exchanger according to claim 3, wherein the threshold value is equal to or greater than a value which is ¼ as large as a difference between an optical intensity of the optical packet input to said optical splitter section at logic value 1 and an optical intensity of the optical packet at logic value 0, and is equal to or less than a value which is ½ as large as the optical intensity of the optical packet at logic value 0.

5. The optical packet exchanger according to claim 2, wherein said phase/intensity conversion section outputs two optical signals having modulated components that are out of phase.

6. An optical packet exchanger for switching a transmission path for an optical packet which constitutes a burst-type optical signal, said optical packet exchanger comprising:

an optical transmitter section operable to transmit an optical packet on which an information signal and an address signal corresponding to a transmission destination for the information signal are superposed by different modulation methods, wherein said optical transmitter section includes:
  a light source operable to output continuous light; and
  an optical modulation section operable to output an optical packet which is obtained by subjecting output light from said light source to an intensity modulation using the information signal and a phase modulation using the address signal; and an optical transmission section for propagating an optical packet transmitted from said optical transmitter section; and a router section operable to receive the optical packet via said optical transmission section, and being operable to switch a transmission path for the optical packet based on the address signal which is extracted from the optical packet, wherein said router section includes:
  an optical splitter section operable to split the optical packet received via said optical transmission section into two optical packets;
  an address reading section operable to read the address signal based on phase information of one of the optical packets output from said optical splitter section;
  an optical phase adjustment section operable to adjust a phase of the other optical packet output from said optical splitter section to a constant phase value, based on the address signal read by said address reading section; and
  a path switching section having a plurality of output ports and being operable to select, based on the address signal read by said address reading section, one of the plurality of output ports from which to output the other optical packet having a phase that has been adjusted to the constant phase value by said optical phase adjustment section.

7. The optical packet exchanger according to claim 6, wherein said address reading section includes:

a phase/intensity conversion section operable to output an optical signal which is obtained by converting optical phase variation in one of the optical packets output from said optical splitter section into optical intensity variation; and a photoelectric conversion section operable to convert the optical signal output from said phase/intensity conversion section into positive and negative address signals, the negative address signal being obtained by inverting a polarity of the positive address signal, and operable to output the positive address signal to said path switching section and the negative address signal to said optical phase adjustment section.

8. An optical packet exchanger for switching a transmission path for an optical packet which constitutes a burst-type optical signal, said optical packet exchanger comprising:

an optical transmitter section operable to transmit an optical packet on which an information signal and an address signal corresponding to a transmission destination for the information signal are superposed by different modulation methods, wherein said optical transmitter section includes:
  a light source operable to output continuous light; and
  an optical modulation section operable to output an optical packet which is obtained by subjecting the output light from said light source to an intensity modulation using the information signal and a phase modulation using the address signal; and an optical transmission section for propagating an optical packet transmitted from said optical transmitter section; and a router section operable to receive the optical packet via said optical transmission section, and being operable to switch a transmission path for the optical packet based on the address signal which is extracted from the optical packet, wherein said router section includes:
  an optical splitter section operable to split the optical packet received via said optical transmission section into two optical packets;
  an address reading section operable to read the address signal from intensity information of one of the optical packets output from said optical splitter section;
  an optical intensity adjustment section operable to adjust an intensity of the other optical packet output from said optical splitter section to a constant intensity value, based on the address signal read by said address reading section; and
  a path switching section having a plurality of output ports and being operable to select, based on the address signal read by said address reading section, one of the plurality of output ports from which to output the other optical packet having a phase that has been adjusted to the constant intensity value by said optical phase adjustment section.

9. A router for switching a transmission path for an optical packet which constitutes a burst-type optical signal and on which an information signal and an address signal corresponding to a transmission destination for the information signal are superposed by different modulation methods, said router comprising:

an optical splitter section operable to split the optical packet into two optical packets;

an address reading section operable to read the address signal based on phase information of one of the optical packets output from said optical splitter section, said address reading section including:
  a phase/intensity conversion section operable to output an optical signal which is obtained by converting optical phase variation in one of the optical packets output from said optical splitter section into optical intensity variation; and
  a photoelectric conversion section operable to convert the optical signal output from the phase/intensity conversion section into positive and negative address signals, the negative address signal being obtained by inverting the polarity of the positive address signal, and operable to output the positive address signal to said path switching section and the negative address signal to said optical phase adjustment section;

a path switching section having a plurality of output ports being operable to select, based on the address signal read by said address reading section, one of the plurality of output ports from which to output the other optical packet output from said optical splitter section; and an optical phase adjustment section operable to adjust a phase of the other optical packet output from said optical splitter section to a constant phase value based on the address signal read by said address reading section, and thereafter operable to output the other optical packet to said path switching section.

10. A router for switching a transmission path for an optical packet which constitutes a burst-type optical signal and on which an information signal and an address signal corresponding to a transmission destination for the information signal are superposed by different modulation methods, said router comprising:

an optical splitter section operable to split the optical packet into two optical packets;

an address reading section operable to read the address signal based on phase information of one of the optical packets output from said optical splitter section, wherein said address reading section includes:

a phase/intensity conversion section operable to output an optical signal which is obtained by converting optical phase variation in one of the optical packets output from said optical splitter section into optical intensity variation; and a photoelectric conversion section operable to convert the optical signal output from said phase/intensity conversion section into an address signal; and a path switching section having a plurality of output ports and being operable to select, based on the address signal read by said address reading section, one of the plurality of output ports from which to output the other optical packet output from said optical splitter section.

11. The router according to claim 10, wherein said photoelectric conversion section is operable to convert an intensity of the optical signal output from said phase/intensity conversion section to logic value 1 if the intensity is equal to or less than a predetermined threshold value and to logic value 0 if the intensity is greater than the predetermined threshold value, thereby being operable to extract the address signal.

12. The router according to claim 11, wherein;

the threshold value is equal to or greater than a value which is ¼ as large as a difference between an optical intensity of the optical packet input to said optical splitter section at logic value 1 and an optical intensity of the optical packet at logic value 0, and is equal to or less than a value which is ½ as large as the optical intensity of the optical packet at logic value 0.

13. The router according to claim 10, wherein said phase/intensity conversion section is operable to output two optical signals whose modulated components are out of phase.

* * * * *